United States Patent
Gehlot (12)

(10) Patent No.: US 6,275,151 B1
(45) Date of Patent: Aug. 14, 2001

(54) COGNITIVE INTELLIGENCE CARRYING CASE

(75) Inventor: Narayan Lal Gehlot, Sayreville, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/481,076

(22) Filed: Jan. 11, 2000

(51) Int. Cl.[7] .................................................. G08B 13/00
(52) U.S. Cl. ...................... 340/541; 340/5.83; 340/5.84; 340/550; 340/692
(58) Field of Search .................... 340/541, 550, 340/692, 568.1, 825.34, 825.31, 5.2, 5.3, 5.7, 5.8, 5.81, 5.82, 5.83, 5.84; 241/36; 109/29, 32, 33, 35, 36, 37

(56) References Cited

U.S. PATENT DOCUMENTS

| | | | |
|---|---|---|---|
| 4,001,643 | | 1/1977 | Ramberg et al. ........................ 361/8 |
| 4,256,991 | | 3/1981 | Otala ..................................... 315/104 |
| 4,804,826 | * | 2/1989 | Hertzen et al. ...................... 235/382 |
| 4,931,770 | * | 6/1990 | Abramson ............................. 340/541 |
| 5,239,166 | * | 8/1993 | Graves .................................. 235/380 |
| 5,309,387 | * | 5/1994 | Mori ...................................... 365/52 |
| 5,315,656 | * | 5/1994 | Devaux et al. ................... 380/52 X |
| 5,406,261 | * | 4/1995 | Glenn ................................... 340/571 |
| 5,582,757 | | 12/1996 | Kio et al. ............................. 219/548 |
| 5,583,296 | | 12/1996 | Mokwa et al. ........................ 73/718 |
| 5,748,084 | * | 5/1998 | Isikoff ................................. 340/568.1 |
| 5,858,500 | * | 1/1999 | MacPherson .......................... 428/68 |

FOREIGN PATENT DOCUMENTS

| | | | |
|---|---|---|---|
| 0218672 | * | 12/1984 | (EP) . |
| 03397 | * | 1/1997 | (WO) . |
| 30447 | * | 8/1997 | (WO) . |

OTHER PUBLICATIONS

IBM Tech. Discl. Bulletin, vol. 39, Issue 1, pp. 261–262, "Security Feature for Personal Computer Card", Jan. 1996.*
IBM Tech. Discl. Bulletin, vol. 40, Issue 2, pp. 3–8, "Microprocessor Theft Deterrent", Feb. 1997.*

* cited by examiner

Primary Examiner—Thomas Mullen
(74) Attorney, Agent, or Firm—Lieberman & Pavane

(57) ABSTRACT

A cognitive intelligent carrying case includes an outer shell layer and a plurality of internal layers defining corresponding interior compartments for storing a variety of specific types of items. The outer shell layer includes access type security systems for authenticating the identity of an individual attempting to access the contents of the case. Each of the internal layers includes one or more security systems operable to destroy the specific items contained in the corresponding compartment. In addition, the case includes communication systems that enable communication with authorized users and/or an owner of the case and which enable the locating of the case when such location information is required. When unauthorized access attempts to the case are detected, the location of the case is determined through an onboard GPS system and the owner of the case is contacted. In the event that the owner cannot be contacted or is contacted and provides the requisite instructions, the security systems are activated to destroy the stored contents of the case.

13 Claims, 3 Drawing Sheets

COGNITIVE INTELLIGENCE CARRYING CASE

BACKGROUND OF THE INVENTION

1. Field of the Invention

The present invention relates to security carrying cases, and more particularly, to an intelligent case for securely carrying a variety of confidential, proprietary, valuable or otherwise important items.

2. Description of the Related Art

With the age of smaller computers, such for example, as laptop computers, has arisen a new age of theft. These small portable computers are prime targets of theft, especially from airports, hotel rooms and offices. Although the loss of the computer hardware is a costly one, the loss of the information stored on the computer can be priceless. As such, the protection of the work and ideas that are stored or present on the computer or on paper is a top priority.

Several defensive mechanisms have been implemented in an effort to strengthen such respositories against theft. Among these are, for example, the use of encryption software in computer programs and startup passwords on the computers. There are many different kinds of encryption software and startup password techniques that one of ordinary skill in the art will recognize as applicable under security type measures to be taken to protect selected information. Other methods use portable hard drives or removable diskettes to store sensitive information when traveling and thereby prevent it from being accessed on a computer without the respective disc or drive.

Although these methods for protecting information work are generally effective, a new problem has thwarted such security measures. That problem is the direct theft of the information when it is not stored on the computer. For example, a removable computer disk containing proprietary and sensitive information stored thereon is just as valuable, if not more valuable than the laptop on which it was generated. As such, there is a need for a carrying case that will enable the secure transport of sensitive information.

Generally carrying cases, such as a brief case, may also be stolen or broken into. The contents of the brief case can be, for example, a laptop computer, jewelry, proprietary and sensitive information and any other item of information that is deemed valuable to the user. Thus, having a carrying case that can lock does not itself prevent the theft and subsequent use or sale of the valuable items stored therein.

SUMMARY OF THE INVENTION

It is therefore an object of the present invention to provide a cognitive carrying case having at least one and preferably more than one security system built into the same for preventing access to the items or information stored in the case even after theft of the case.

It is a further object of the invention to provide a cognitive intelligent carrying case that includes a tracking system for identifying the then current location of the cognitive intelligent carrying case in the event that it is stolen.

These and other objects are achieved in accordance with the present invention wherein the case includes an outer shell layer and a plurality of internal layers each having corresponding compartments contained within the outer shell and adapted to receive and store a plurality of different types of items. The outer shell includes at least one security system adapted to detect attempts to access the case and to authenticate a user's authority to access the case. Each of the plurality of internal layers also includes at least one security system that is adapted to destroy specific types of items stored in the respective compartment.

A plurality of communication systems are disposed in at least one of each of the plurality of layers. The communication systems are adapted to communicate with authorized users/owners of the carrying case during access attempts or theft of the case.

The case includes processing capabilities that are connected to each of said security and communication systems for controlling the security systems to destroy the contents of the case when required and to control access to the case.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference numerals denote similar elements throughout the several views.

DETAILED DESCRIPTION OF THE PRESENTLY PREFERRED EMBODIMENTS

Figure 1:
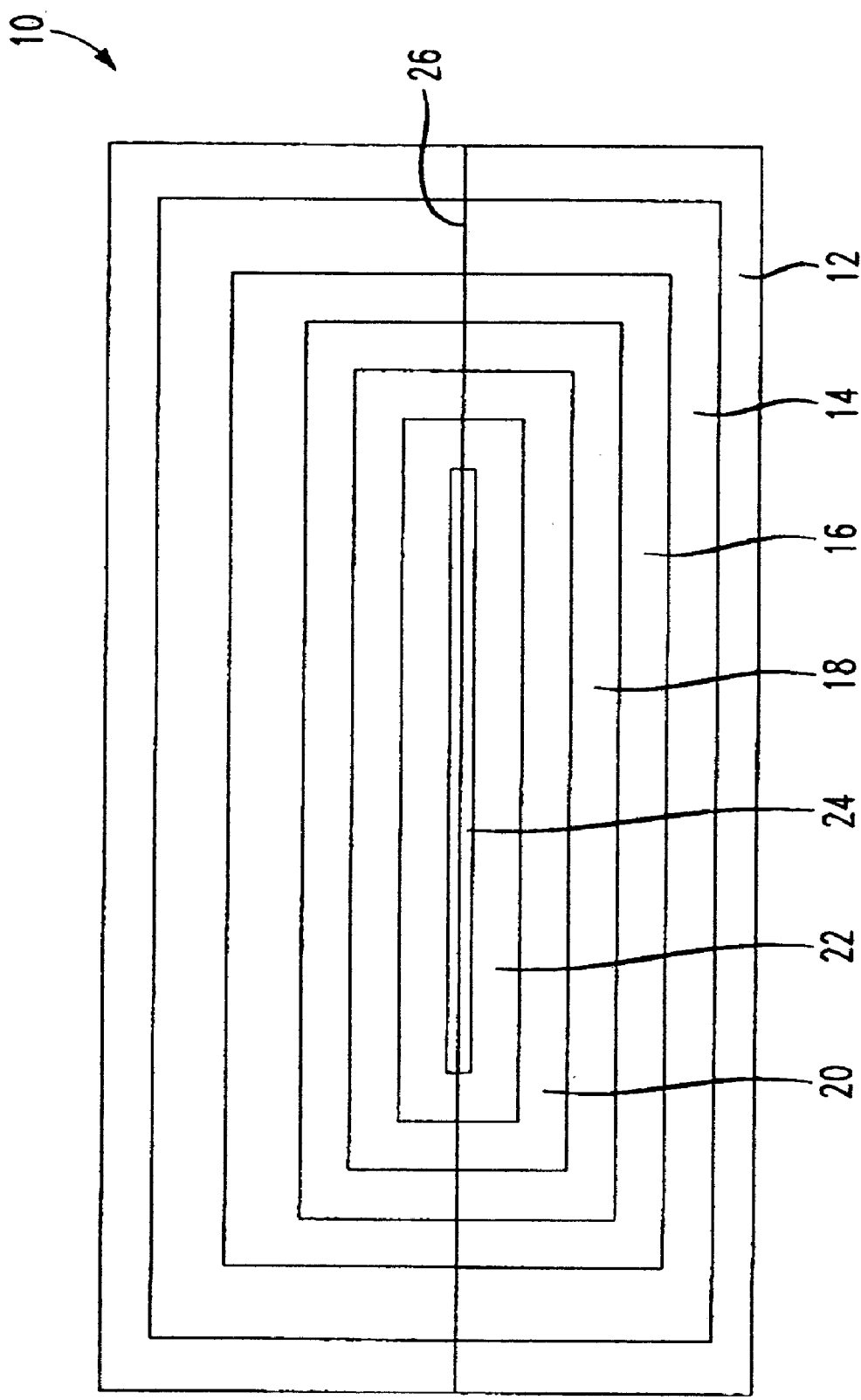
FIG. 1 is a plan view of the cognitive intelligent case according to an embodiment of the present invention.

FIG. 1 shows a plan view of a cognitive carrying case 10 constructed in accordance with an embodiment of the present invention. As shown, case 10 has several layers including an outer shell layer 12 and a plurality of internal layers 14, 16, 18, 20, 22 and 24. Although six (6) such layers are shown, it is to be understood that more or less layers may be used according to the present invention. The case 10 is adapted to open along line 26. In accordance with a preferred embodiment of the present invention, carrying case 10 has the outer shell layer 12 and may then have any one or more of the disclosed internal layers. Each internal layer contains a compartment for storing items and a security system adapted to protect and potentially destroy (or render unusable) the contents of the particular compartment in the event of a detected unauthorized access to the case. As such, it should be understood that each layer (as described herein) and corresponding compartment may be implemented into carrying case 10 alone or in conjunction with any number of other internal layers. In addition, the position of any one internal layer with respect to other layers may be interchanged without departing from the spirit of the invention. Furthermore, it is to be understood that the term "layer" as used herein may refer to a specific compartment within the case and does not necessarily require a layered construction as depicted in FIG. 1. For example, a multi-compartment case is also contemplated. One of ordinary skill will recognize that each compartment can have its own security system as described herein without departing from the spirit of the present invention. Thus, it will be apparent to those of skill in the art that the carrying case 10 of the present invention may have an unlimited number of specific applications for which it is designed and/or adapted to operate.

Figure 2:
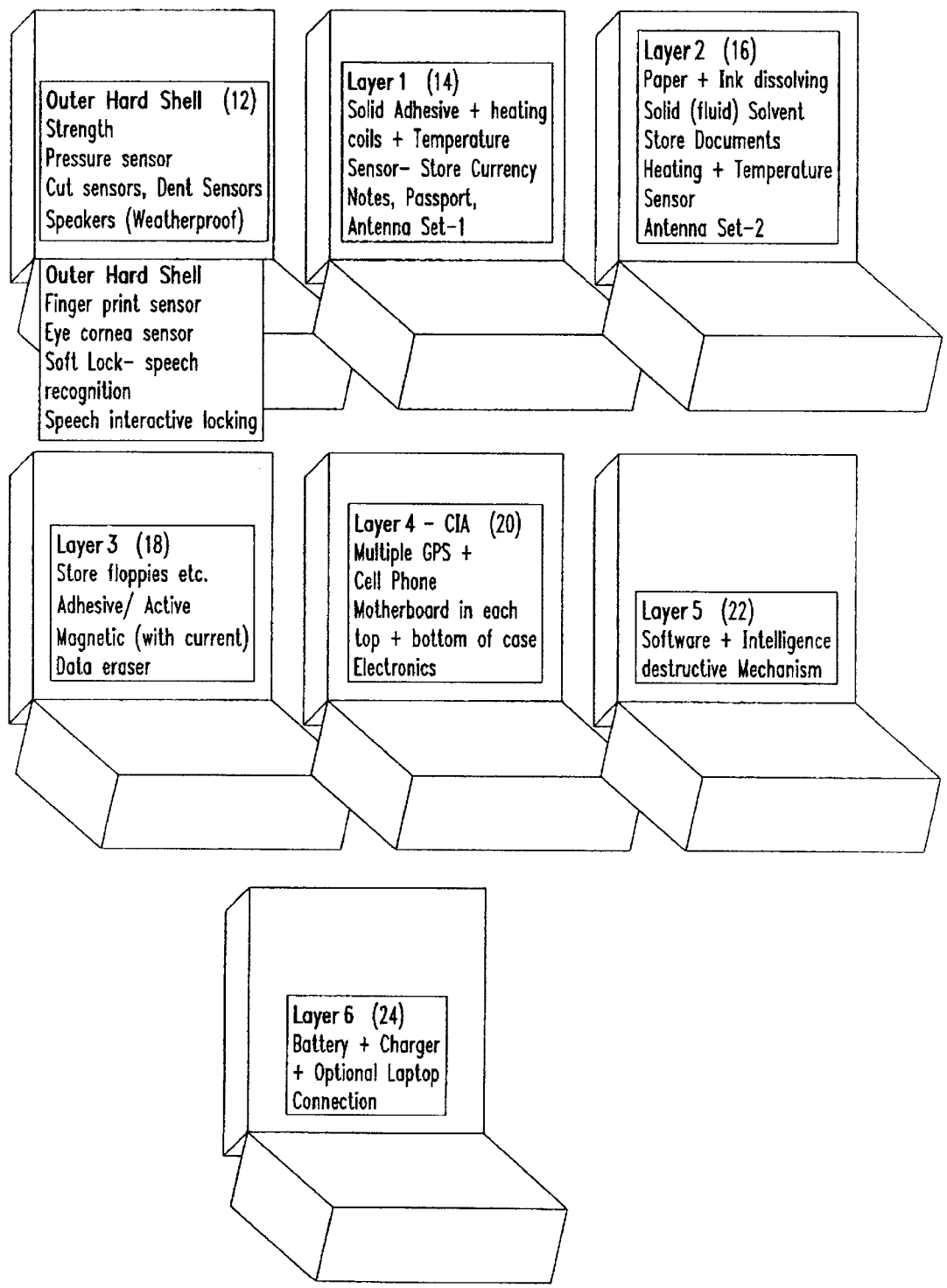
FIG. 2 is a schematic block diagram of the various different layers of an embodiment of the cognitive intelligent case according to the invention.

FIG. 2 shows by way of example a breakdown of the respective layers and the systems integrated therein. For example, in this embodiment the outer hard shell layer 12 is formed of a rugged cut-resistant material and may include security systems such as a strength/pressure sensor, cut sensors, dent sensors, a fingerprint sensor and/or eye cornea sensor for enabling authorized access to case 10, or a speech recognition locking system that also enables and disables access to the case based on the input of an user's speech. All of these technologies are well known and are readily available. An example of a suitable pressure sensor can be found in U.S. Pat. No. 5,583,296, which is incorporated by reference herein. The combination of cut and pressure sensors is the first cognitive step in determining whether an unauthorized access to case 10 is being attempted (i.e., that someone other than the owner or intended user is attempting to access the contents). The remaining systems (i.e., fingerprint, eye cornea and speech recognition) provide additional access security to case 10 and can also be used to, in these states affected by higher power loss, detect that an unauthorized access to case 10 is being attempted. In addition, outer layer 12 can include at least one, and optimally a plurality of weatherproof audio speakers or other output device for providing audible alarms and/or broadcasting emergency type recordings to the surrounding environment. Thus, when any of the sensors in outer shell 12 indicate an attempted unauthorized access, an audible alarm may be sounded through the speakers, or one or more voice messages may be broadcast by the speakers to alert those people in the surrounding environment that case 10 has been stolen or that an unauthorized access is being attempted. One example of such announcement may be "I am a (case color, e.g. black) colored carrying case that has been stolen. Please call police to catch thief", or simply "Help, theft in progress". Any type of voice message may be implemented as a function of the desired application.

The first layer 14, within the outer shell 12, is fabricated of microscopic porous holes that are covered with a fast curing adhesive such as quick fix or KRAZY GLUE® stored in a solid form in fine layers. A distributed line of conductors along or within the layer monitor the temperature and include heating elements operable to melt the solid glue into liquid form for release into the storage compartment of this layer. An example of a temperature monitoring device that may be utilized in layer 14 can be found in U.S. Pat. No. 5,582,757, which is incorporated by reference herein. Those skilled in the art will recognize that many other and different types of temperature sensing devices may be employed without departing from the scope of the present invention. The adhesive in the layer may also be replaced or supplemented with a paint or enamel suitable for bonding to the articles stored in the compartment formed by layer 14 upon detection of unauthorized access attempts. Examples of such articles to be so protected include documents, cash and any other valuable property (e.g., jewelry). First layer 14 may also include an antenna or antenna set that can be connected to other systems such, for example, as geographic positioning systems (GPS) for use in locating the case and/or cellular or any other wireless communication systems such for example, as a global system for mobile communication (GSM) for communicating the theft or unauthorized access attempts to selected individuals or organizations.

The next layer 16 and corresponding compartment formed thereby can be adapted to receive and store documents or the like of any kind. The security systems in layer 16 can include heating and temperature sensors that are responsive to human touch, and solid paper/ink dissolving solvents that become liquid in the presence of heat and will destroy any paper document stored in the corresponding compartment. Thus, the materials stored in this compartment can be any type of paper materials or documents including, but not limited to, legal documents, cash and other documents deemed important by the user. As shown in FIG. 2, layer 2 (16) may include another antenna or antenna set connected to, for example, a geographic positioning system (GPS), cellular communication device or any other wireless communication system. This second antenna set may also operate as a backup to the first antenna set or can be operable with a separate or different system than that of the first antenna set. For example, the first antenna set may be adapted for GPS operation while the second antenna set may be adapted for wireless communication with the owner or other authorized entity.

Another internal layer 18 has a security system that includes an adhesive release mechanism and a magnetic data erasing mechanism. The compartment corresponding to layer 18 is adapted to store computer disks (either floppy or CD ROM type, for example) and tapes or other data storage media. For storage media that is magnetic in nature (e.g., floppy disks, backup tapes, etc.) the active magnetic erasing system may comprise an electromagnet that is activated upon detection of unauthorized access to case 10. The electromagnet is disposed within the compartment so that, when it is activated by providing it with an electrical current, the magnetic field it creates will erase and/or effectively corrupt the data stored on any magnetic media within the compartment. In the event that the media stored in the compartment is not magnetic (e.g., CD ROM), an adhesive release mechanism similar to that discussed with reference to layer 14 is employed to destroy the stored media by releasing adhesive onto the media and thereby rendering it unreadable.

The next layer 20 of the case 10 is not a security layer but rather contains the intelligence and processing capabilities of the entire case and that enable it to operate as intended. Located for example in both the top and bottom parts of the case, this layer contains one or more computer motherboards or other primary processing systems that may include one or more microprocessors, memory and software storage devices with the necessary software to run the onboard security systems. The computer motherboard(s) contained in this layer will also serve to operate the GPS and/or wireless communication systems that may be utilized or implemented with the first and second antenna sets described hereinabove.

In the next layer 22, a software and intelligence destruction mechanism is integrated in order to destroy and or delete existing software in the case and stored in the disk storage device associated with the motherboard(s) in layer 20.

Another layer 24 of the case 10 is also not a security layer, but rather part of the operational layer(s) required to operate case 10. For example, layer 24 may include a battery pack to provide power to the motherboards and all security systems integrated into case 10, as well as provide power to a laptop computer that may be selectively connected to a designated connector within this layer. A charger or other type of power supply may also be provided to charge the laptop battery from the onboard battery, or to enable the charging of the on-board battery from an external AC or DC source. Another designated connector may also be provided to enable the connection of an external computer, such as a laptop, for configuring and setting up case 10 to recognize specific users and to operate in a predetermined manner.

As mentioned previously, it is important to understand that all of the layers described herein may be selectively interchanged and or removed to accommodate a particular demand or application for case 10.

Figure 3:
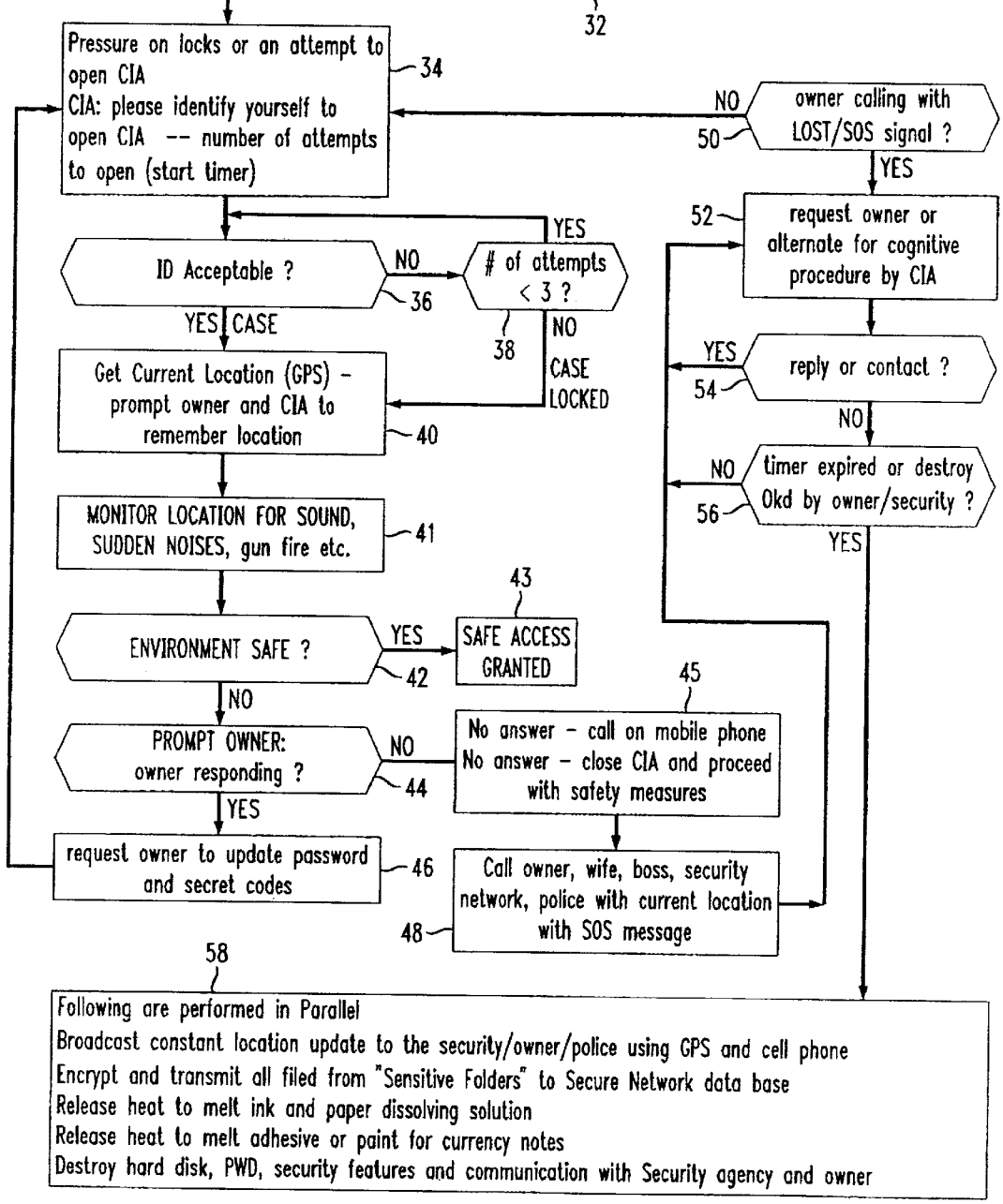
FIG. 3 is a flow chart of the operation of the cognitive intelligent case according to an embodiment of the invention.

Operation and use of an embodiment of case 10 is now described in conjunction with the flow diagram 30 of FIG. 3. Initially, user registration (step 32) must be performed. User registration consists of registering the case 10 with a local and/or international wired or wireless communication company (when applicable) and inputting the various security parameters that will be used to define and determine the authorized user(s) of case 10. As discussed hereinabove, these security parameters may include passwords and secret codes (in voice and/or keypad input form), and fingerprint and eye cornea scan data. Other personal information such as date of birth, mother's maiden name, etc. may also be obtained and stored in order to securely identify the user when necessary. It is also contemplated that the handle of case 10 include heat, pulse and/or position sensors to identify the heat and pulse patterns of a specific user and the grip position that this user maintains with or without gloves when carrying case 10. Once this registration has been performed, case 10 is ready for use. When case 10 is then closed, the security systems implemented therein are armed and in a standby state awaiting an activation command from the central processor.

When an attempt to open case 10 is made (step 34), the case requests the user to identify themselves in the form of a voice message. Once case 10 announces the identification request, it starts a timer to time how long the user's access attempt takes. A determination is then made (step 36) as to whether the user has provided an acceptable ID. When the user or person attempting to access the case provides an acceptable ID, the case is opened (unlocked) and the current location of case 10 is determined (step 40)—using the on board GPS system—and recorded. When the identification is not acceptable (at step 36), the number of attempts are counted (step 38) and, when such attempts number less than three (3), the user is prompted to try again and the determining step 36 is performed again.

If the user attempts three or more ID inputs at steps 36 and 38 that still result in an unacceptable ID, case 10 begins a security check while case 10 remains locked. When either an acceptable ID has been provided (step 36) and the case is unlocked, or 3 or more failed ID attempts have been made, the location of the case is determined (step 40) by accessing the on-board GPS system.

Once the location of case 10 is determined (at step 40), its ambient environment is monitored for sound (step 41). The sound monitoring performed at step 41 is intended to determine whether the environment surrounding case 10 is a safe one for enabling access to the contents of the case. For example, sound monitoring may be performed with a microphone contained in the case to listen for any loud noises or the presence of emergency-type situations such, for example, as tires screeching, gun shots, etc. When the environment is determined to be safe (step 42), access is granted to the contents of the case (step 43). The environment is determined to be safe when, for example, the ambient noise monitored at step 41 does not exceed some predetermined threshold. If the environment is deemed unsafe (step 42), the owner of case 10 is called (using one of the onboard communication systems) or is prompted to respond to the case's call. A determination is then made (step 44) as to whether the owner is responding to the attempted contact. If the owner responds (at step 42), the owner is requested to update any passwords or secret codes and the user is again prompted to identify themselves to open the case (step 34). This confirmation provided by the case prevents false alarms resulting from environmental monitoring which may not always present an accurate representation of the state of the surrounding environment of case 10. If the owner does not respond to the attempts at contact at step 44, the case proceeds with its safety measures (step 45).

The first of the safety measures taken includes sending an SOS or request for assistance message to other predetermined persons or organizations associated with the security case 10 or as authorized or instructed by the owner (step 48). Such safety measures may include further attempts to contact the owner and attempts to contact other authorized persons or organizations that may be helpful in retrieving the case or which should be put on notice that unauthorized access to the case has been attempted. These persons or organizations may include, for example, the owner's spouse, a boss or supervisor, a security network, the police, etc.

Once the safety measures are performed in step 48, the persons or organizations contacted are prompted for an alternate cognitive procedure for the case to perform (step 52). Examples of the alternate cognitive procedures may be: 1) a security agency, along with the user's boss or supervisor, may reset the access procedure on the fly and from a remote location; 2) If the user sounds worried (as detected by the voice recognition system), the case is rendered inaccessible by the user and a system error display is made reading "inaccessible"; and 3) the owner in conjunction with their boss and/or security agency may cause the case to be destroyed immediately.

In another or modified embodiment, when the case 10 is stolen, or the owner has lost it, the owner may call or communicate with the case 10 to input a lost or SOS signal (step 50). The case then performs step 52 by attempting to contact the person/owner and/or organization to request an alternate procedure. After the person/owner and/or organization is contacted (step 54), case 10 returns to step 52 to await alternative instructions. A reply or other contact response is awaited, at step 54, at which a timer is started; the process then proceeds to step 56 where a determination is made as to whether the timer has expired, or whether the owner or organizations contacted have authorized destruction of the contents of the case. Where the timer has not expired and no authorization to destroy has been obtained, the case repeats steps 52 and 54 until either the timer expires, authorization to destroy is received, or an alternate procedure for case 10 is provided. When either the timer has expired or the authorization to destroy has been received, the case proceeds to step 58 at which the security functions of each layer of the case are activated.

The security functions hereinabove described in conjunction with FIG. 2 for the various layers are activated at step 58. These functions are performed in parallel—i.e. at the same time for each of the respective layers. For example, these functions can include broadcasting of a constant location update to the owner/police using the onboard GPS and wireless communication systems; encrypting and transmitting all sensitive data electronically stored in the case 10 or in a laptop contained in case 10 to a secure network database; releasing heat to melt ink and paper dissolving solutions; releasing heat to melt an adhesive or paint for marking or destroying currency notes; and activating a self destruct program to destroy the case's onboard hard drive, memory and/or chips on the motherboard so as to prevent further use of case 10.

While there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

I claim:

1. A carrying case comprising:

an outer shell layer;

a plurality of internal layers within said outer shell layer and each defining a corresponding compartment contained within the outer shell for receiving and storing a plurality of different types of items within said compartments;

at least one security system disposed in each of said outer shell layer and said each of the plural internal layers, each of said at least one security systems in said plural internal layers being adapted to destroy a specific one of the different types of items that is storable in the corresponding compartment, and wherein said at least one security system in said outer shell layer is operable to detect attempts to open and thereby access the case and to authenticate a user's authority to access the case;

a plurality of communication systems disposed in at least one of said plural internal layers, said communication systems being adapted to communicate with an authority having rights of determination over the carrying case; and processing means connected to each of said security and communication systems for controlling said systems and thereby controlling access to the case.

2. The carrying case in accordance with claim 1, wherein said outer shell layer comprises a cut-resistant material and said at least one security system in said outer shell layer comprises a device selected from a group consisting of pressure sensors, cut sensors, dent sensors, fingerprint sensors, eye cornea sensors, and speech recognition locking mechanisms.

3. The carrying case in accordance with claim 1, wherein said outer shell layer further comprises a speaker adapted to provide the user with voice instructions and to broadcast emergency alerts to an environment surrounding the case.

4. The carrying case in accordance with claim 1, wherein said at least one security system in said at least one internal layer comprises a document destruction system.

5. The carrying case in accordance with claim 1, wherein said at least one security system in said at least one internal layer comprises a magnetic media destruction system.

6. The carrying case in accordance with claim 1, wherein said at least one communication system comprises a geographic positioning system.

7. The carrying case in accordance with claim 6, wherein said at least one communication system comprises an antenna set disposed in one of said plural internal layers.

8. The carrying case in accordance with claim 1, wherein said at least one communication system comprises a wireless communication system.

9. The carrying case in accordance with claim 8, wherein said wireless communication system comprises a system selected from a group consisting of a cellular communication system and a global system for communication.

10. The carrying case in accordance with claim 1, wherein said processing means comprises a motherboard disposed in one of said plural internal layers and having processing and memory capabilities.

11. The carrying case in accordance with claim 1, wherein one of said plural internal layers comprises a battery power source for providing power to all security and communication systems contained within the case.

12. The carrying case in accordance with claim 11, wherein one of said plural internal layers comprises a connector for connecting the case to an external computer for use in configuring the carrying case for operation with a particular one or more users.

13. A method for implementing security functions of a security carrying case comprising the steps of:

registering an authorized user for the security carrying case by requiring the authorized user to input at least one of a plurality of pieces of identification;

detecting an attempt to access the security carrying case by an individual;

determining whether the individual attempting to access the case is an authorized user by requiring an identification input from the individual;

determining a current location of the security carrying case during an attempted access to the case using an on-board geographic positioning system;

monitoring the environment surrounding the determined location using the security carrying case during an attempted access to the case to determine whether the surrounding environment is safe to grant access to an authorized user;

granting access to the security carrying case when the user attempting to access is determined to be an authorized user and the monitored environment is determined to be safe; and initiating operation of security systems and access-preventing procedures of the security carrying case when at least one of a predetermined unauthorized access attempt is made and the monitored environment is determined to be unsafe.

* * * * *